(12) United States Patent
Annamalai

(10) Patent No.: US 7,113,794 B2
(45) Date of Patent: Sep. 26, 2006

(54) WLAN DEVICE POSITIONING

(75) Inventor: Magesh Annamalai, Boca Raton, FL (US)

(73) Assignee: Siemens Communications, Inc., Boca Raton, FL (US)

( * ) Notice: Subject to any disclaimer, the term of this patent is extended or adjusted under 35 U.S.C. 154(b) by 509 days.

(21) Appl. No.: 10/219,776

(22) Filed: Aug. 15, 2002

(65) Prior Publication Data
US 2004/0203869 A1 Oct. 14, 2004

(51) Int. Cl.
*H04Q 7/20* (2006.01)
(52) U.S. Cl. .................... 455/456.1; 455/456.2
(58) Field of Classification Search ............ 455/456.1, 455/456.2, 456.3, 456.6
See application file for complete search history.

(56) References Cited

U.S. PATENT DOCUMENTS

| 2003/0035519 A1* | 2/2003 | Warmus .................. 379/88.17 |
| 2003/0058808 A1* | 3/2003 | Eaton et al. ................. 370/310 |
| 2005/0159173 A1* | 7/2005 | Dowling .................. 455/456.3 |
| 2005/0192024 A1* | 9/2005 | Sheynblat ................ 455/456.1 |

FOREIGN PATENT DOCUMENTS

| EP | 1 130 933 A1 | 9/2001 |
| WO | WO 00/76171 A1 | 12/2000 |
| WO | WO 03/045084 | * 11/2001 |
| WO | WO 01/95056 A2 | 12/2001 |
| WO | WO 02/32100 A1 | 4/2002 |

OTHER PUBLICATIONS

Oliver Balbach: "UMTS—Competing Navigation System and Supplemental Communication System to GNSS" 'Online! Sep. 22, 2002, XP-002269020, pp. 519-527.
"IEEE 802.11 Wireless LAN PHY Layer (RF) Operation and Management" (Application Note 1380-2). © Agilent Technologies, Inc. 2002.—28pgs., no month listed.
Djuknic, Goran M. and Richton, Robert E., "Geolocation and Assisted GPS", Feb. 25, 2001, pp. 123-125.
"3GPP TS 43.059 v4.4.0 (Feb. 2002)", 3$^{rd}$ Generation Partnership Project; Technical Specification GSM Edge Radio Access Network; Functional stage 2 description of Location Services (LCS) in GERAN (Release 4). 51pgs., no month listed.
Introduction to Wireless LANS: How Radio WLANs Work, download from http://www.wlan.org.uk/hrww.htm on Jun. 26, 2002.—12 pgs.
Article—Introduction to Wireless LANs, www.wlana.com . 12pgs., no date listed.
"EKAHAU—Differentiate Your Products with Accurate WLAN Positioning", download from http://www.ekahau.com/index.shtml, on Jun. 28, 2002. © 2000-2002 Ekahau, Inc.—14pgs.

* cited by examiner

*Primary Examiner*—Temica Beamer

(57) ABSTRACT

A system for positioning a wireless LAN device includes a client device for transmitting a positioning request, the positioning request identifying a wireless LAN device, a location server for receiving the request, and a backbone network for requesting a position from the wireless LAN device and receiving position information from the wireless LAN device, wherein the backbone network transmits the position information to the location server, and wherein the location server determines positioning data based on the position information and the request, and transmits the positioning data to the client device.

19 Claims, 8 Drawing Sheets

| CLIENT ID 701 | AUTHORIZATION DATA 702 | SUBCRIPTION TYPE 703 | EXPIRATION 704 |
|---|---|---|---|
| C3496 | PASSWORDME | UNLIMITED | 1/3/2003 |
| C8444 | 123CRT | 2 OF 4 PER MONTH | 12/6/02 |
| C4232 | 1.3.11.8 | PAY PER USE | N/A |
| C7486 | *#$!#% | UNLIMITED | 1/13/2000 |

| CLIENT ID 801 | WLAN DEVICE ID 802 | TYPE 803 | SERVICE QUALITY 804 | FORMAT 805 | RESULT 806 |
|---|---|---|---|---|---|
| C3496 | RT10113 | COMMERCIAL | MEDIUM ACCURACY, 30-60 S, LOW PRIORITY | DEGREE | 5°30" 40' LAT. 20° 35" 55' LONG. |
| C4232 | RT26487 | EMERGENCY | HIGH ACCURACY, <5 S, HIGH PRIORITY | UTM | ZONE 13 UTM E: 408.745 UTM N: 3873.30 |
| C3496 | RT17948 | COMMERCIAL | MEDIUM ACCURACY, 15 TO 30 S, LOW PRIORITY | DECIMAL DEGREE | 5.5111 LAT. 20.5123 LONG. |

FIG. 6

WLAN DEVICE POSITIONING

BACKGROUND OF THE INVENTION

The present invention relates generally to device positioning services, and more particularly to services for positioning a wireless local area network (LAN) device.

Until recently, computer networks required substantial lengths of cabling and large hardware components. Installation of this infrastructure was not only expensive but also tied network users to the locations of their nearest network connections. Modern advances in communications, processing speed and miniaturization have allowed the development of partially or fully wireless networks that alleviate many of the drawbacks of prior computer networks.

One example of a wireless network is a cellular telephone network such as a Global System for Mobile communication (GSM) telephone network. Another type of wireless network is a wireless Local Area Network (LAN) governed by the IEEE 802.11a, 802.11b, ETSI BRAN HiperLAN/2, and other wireless LAN standards. Conveniently, such a wireless LAN is capable of interfacing with a standard LAN (IEEE 802.3) and can therefore be added to existing wired computer networks. Wireless networks may be accessed by traditional network devices such as desktop computers equipped with a wireless network adapter. However, the core advantages of wireless networks are particularly exploited when they are used in conjunction with mobile devices.

Mobile devices for use with wireless networks are becoming ubiquitous. Leading this trend is the cellular telephone. The U.S. Federal Communications Commission has mandated that, due to their ubiquity, a cellular telephone network operator must be capable of providing safety authorities with the position of a cellular telephone that has placed a call to 9-1-1 using its network. Standards are currently being developed by the 3$^{rd}$ Generation Partnership Project (3GPP TS 43.059) to address this mandate.

Although not yet as prevalent as cellular telephones, the low cost of mobile computing devices and wireless LAN adapters has resulted in dramatic increases in the number of wirelessly networkable devices that are currently deployed. The number of wireless access points to which these devices may connect to a wired LAN is also increasing. Accordingly, it would be useful to provide services that determine a location of wireless devices connected to a wireless LAN. Some current products such as the Ekahau Positioning Engine™ attempt to address this need.

_____ What is needed, however, is a system to provide positioning of a wireless LAN device in a more efficient manner than is currently available.

SUMMARY OF THE INVENTION

To address at least the above problems, some embodiments of the present invention provide a system, method, apparatus, and means to receive a request for positioning a wireless LAN device, transmit the request to a backbone network, receive position information from the backbone network, the position information generated at least in part by a GPS-based device integrated with the wireless LAN device, and generate positioning data based on the position information.

According to some embodiments, the present invention provides a system for positioning a wireless LAN device that includes a client device for transmitting a positioning request, the positioning request identifying a wireless LAN device, a location server for receiving the request, and a backbone network for requesting a position from the wireless LAN device and receiving position information from the wireless LAN device. The backbone network transmits the position information to the location server, while the location server determines positioning data based on the position information and the request, and transmits the positioning data to the client device.

The present invention is not limited to the disclosed embodiments, however, as those of ordinary skill in the art can readily adapt the teachings of the present invention to create other embodiments and applications. The nature of this invention, as well as its advantages, will become readily apparent from consideration of the following specification as illustrated in the accompanying drawings, in which like reference numerals designate like parts.

BRIEF DESCRIPTION OF THE DRAWINGS

FIG. 5 is a tabular representation of a portion of a client subscription database according to some embodiments of the present invention;

FIG. 6 is a tabular representation of a portion of a request database according to some embodiments of the present invention;

DETAILED DESCRIPTION OF SPECIFIC EMBODIMENTS

The following description is provided to enable any person of ordinary skill in the art to make and use the invention and sets forth the best modes contemplated by the inventor for carrying out the invention. Various modifications, however, will remain readily apparent to those in the art.

Figure 1:
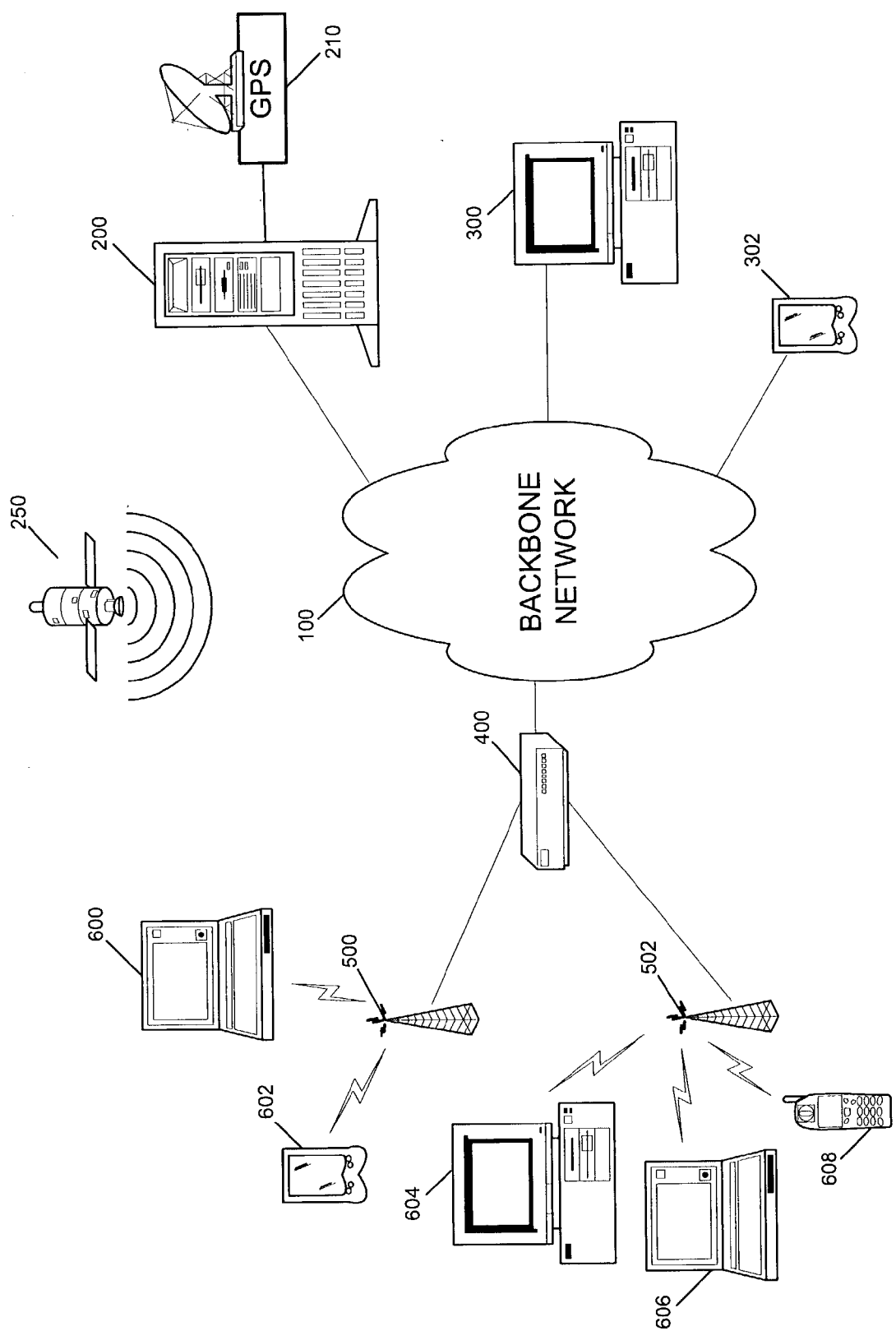
FIG. 1 is diagram illustrating a network architecture according to some embodiments of the present invention.

FIG. 1 illustrates a network architecture of a system according to some embodiments of the present invention. As shown, backbone network 100 provides communication between location server 200, client devices 300 and 302, and network device 400.

Backbone network 100 may comprise any number of different systems for transferring data, including a Local Area Network (LAN), a Metropolitan Area Network (MAN), a Wide Area Network (WAN), a proprietary network, a Public Switched Telephone Network (PSTN), a Wireless Application Protocol (WAP) network, a wireless LAN (e.g., in accordance with the Institute of Electrical and Electronics Engineers 802.11b standard), and a Bluetooth network. Moreover, backbone network 100 may transfer data over one or more of any currently or hereafter-known medium, including copper wire, fiber-optic cabling, infrared signals, RF signals, or the like. In some embodiments, backbone network 100 comprises an IP network such as the World Wide Web.

Location server 200 provides location services to client devices such as client devices 300 and 302. Location server 200 is depicted as a network server in FIG. 1, but may comprise any type of device or devices suitable for performing the steps attributed to location server 200 below. Location server 200 may also be used to perform steps to provide location services for a GSM network according to the 3GPP TS 43.059 technical specification. In such embodiments, hardware duplication may be reduced because only one location server is needed to provide positioning services for both GSM and wireless LAN devices.

Location server 200 communicates with GPS device 210 in order to receive and process data from GPS satellite 250. This data may be used to provide GPS assistance data to a wireless LAN device. A brief description of assisted GPS technology is set forth below.

Client devices 300 and 302 comprise a desktop computer and a personal digital assistant (PDA), respectively. Client devices 300 and 302 transmit requests for the position of wireless LAN devices and receive position information in response to the requests. Accordingly, client devices 300 and 302 are capable of transmitting data to and receiving data from backbone network 100. Client devices 300 and 302 are also capable of transmitting data to and receiving data from devices that are directly or indirectly in communication with backbone network 100, including location server 200, network device 400 and wireless LAN devices 600 through 608. Client devices 300 and 302 may comprise dedicated terminals or multi-function devices that provide their respective operators with functionality that is unrelated to some embodiments of the present invention.

Network device 400 may comprise a switch, a router, a bridge or any other network component or components which provides wireless access points 500 and 502 with access to backbone network 100. In this regard, access points 500 and 502 may comprise transceivers that connect to a wired network and receive, buffer and transmit data between a wireless LAN and the wired network. The wireless LAN may be governed by one or more of the 802.11(a), 802.11(c), 802.11 HR, ETSI BRAN HiperLAN/2, HiperLAN and other wireless LAN standards. A single access point may support several users and may have a range of up to several hundred feet. To maximize their range, access points are usually mounted at an elevation higher than the wireless LAN devices they are expected to serve.

Wireless LAN devices 600, 602, 604, 606 and 608 comprise a laptop computer, a PDA, a desktop computer, a laptop computer and a cellular telephone, respectively. Each wireless LAN device is adapted to interface with access points such as access points 500 and 502. Some of wireless LAN devices 600 through 608 may therefore include wireless LAN adapters that are implemented as PCMCIA cards or ISA/PCI adapters. Of course, the wireless LAN interface may be fully integrated with one or more of wireless LAN devices 600 through 608.

Each wireless LAN device 600 through 608 is associated with one of access points 500 and 502 in FIG. 1. In this regard, the area served by a single access point is referred to as a microcell, and a wireless LAN device is associated with a single microcell and its associated access point. In some embodiments, individual microcells overlap to provide continuous communication with the wired network. The actual coverage area of a microcell is dictated by many factors, including its power and environmental conditions. The access points "forward" the wireless LAN devices from one to another as the devices move among the associated microcells.

One or more of wireless LAN devices 600 through 608 may include a GPS receiver for generating position information representing the respective geographic positions thereof. The receiver may be integrated with and/or peripheral to (e.g., an adapter card, a peripheral attachment or plug-in module) the one or more wireless LAN devices. As will be described in detail below, the position information may be generated using conventional GPS or assisted GPS methods.

A brief description of operation of the FIG. 1 elements according to some embodiments of the invention follows. A more detailed description is provided below with respect to FIG. 7. Initially, a client operates one of client devices 300 and 302 to request the position of one of wireless LAN devices 600 through 608 from location server 200. Location server 200 receives the request and forwards the request to backbone network 100. Network device 400 of backbone network 100 then requests the position from the wireless LAN device. The wireless LAN device determines its position using its on-board GPS receiver or using its assisted GPS receiver in conjunction with information received from GPS device 210 of location server 200. Position information is returned to location server 200 from the wireless LAN device and is converted to positioning data in a format requested by the client device. Location server 200 then transmits the positioning data to the client device.

In some embodiments, the wireless LAN device determines code phase measurements and forwards the measurements to location server 200. Location server 200 then generates positioning data based on the code phase measurements and transmits the data directly to the client device.

In some embodiments, the devices of FIG. 1 are connected differently than as shown. For example, some or all of the devices may be connected directly to one another. Of course, embodiments of the invention may include devices that are different from those of FIG. 1. It should also be noted that although the devices are shown in communication with each other, the devices need not be constantly exchanging data. Rather, communication may be established when necessary and severed at other times or always available but rarely used to transmit data. Moreover, although some of illustrated communication links appear dedicated and hardwired, it should be noted that each of the links may be shared by other devices and may comprise one or more wireless links.

Figure 2:
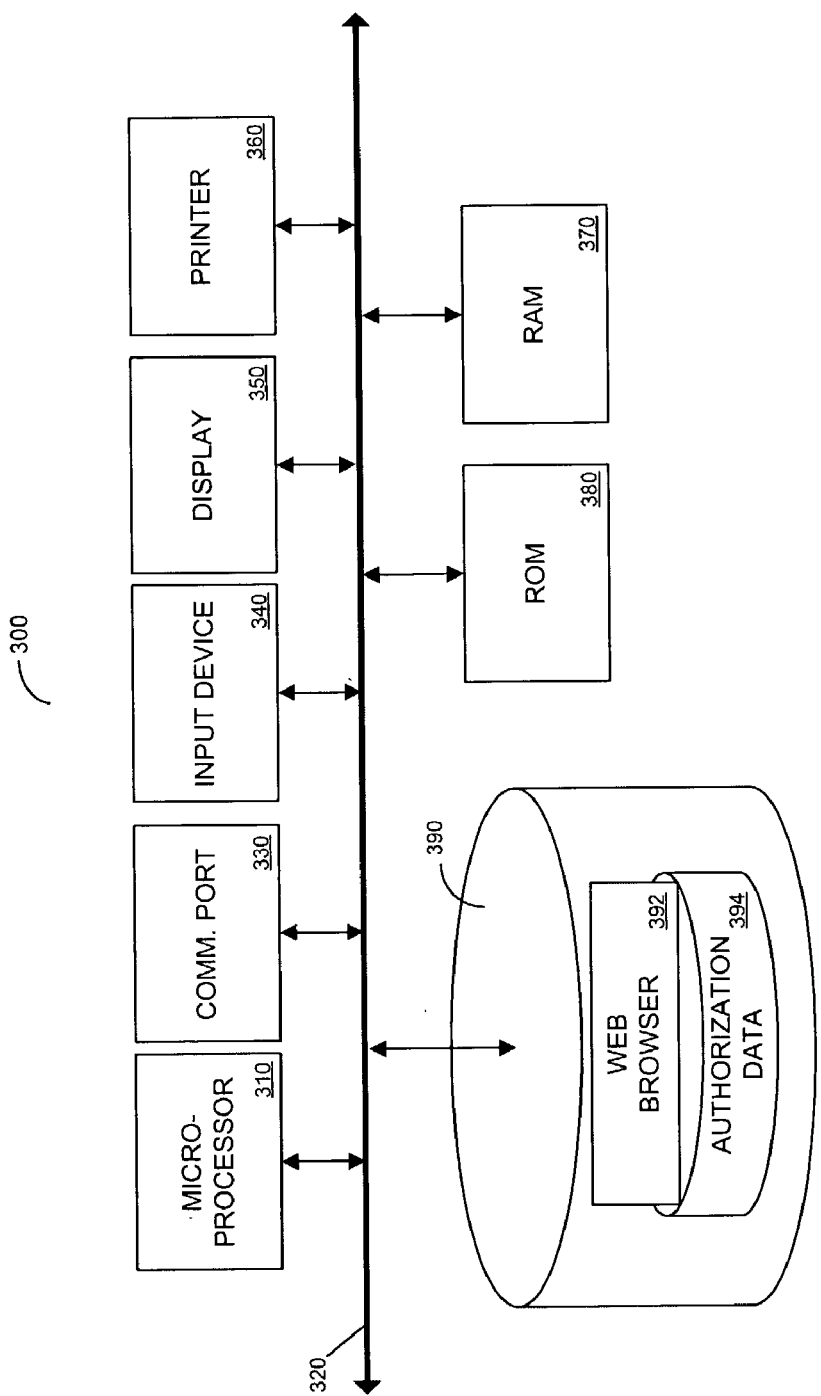
FIG. 2 is a block diagram illustrating elements of a client device according to some embodiments of the present invention.

FIG. 2 is a block diagram illustrating several components of client device 300 according to some embodiments of the invention. As described above, client device 300 may be used to request the position of a wireless LAN device. Client device 300 comprises microprocessor 310 in communication with communication bus 320. Also in communication with communication bus 320 is communication port 330. Communication port 330 is used to transmit data to and to receive data from devices external to client device 300. Communication port 330 is therefore preferably configured with hardware suitable to physically interface with desired external devices and/or network connections. For example, communication port 330 may comprise an Ethernet connection to a local area network through which client device 300 may receive and transmit information over the Web.

Input device 340, display 350 and printer 360 are also in communication with communication bus 320. Any known input device may comprise input device 340, including a keyboard, mouse, touch pad, voice-recognition system, and any combination of these devices. Of course, information may also be input to client device 300 from other devices via communication port 330. Display 350 may be an integral or separate CRT display, flat-panel display or the like used to display graphics and text in response to commands issued by microprocessor 310. Printer 360 may also present text and graphics to an operator, but in hardcopy form using ink-jet, thermal, dot-matrix, laser, or other printing technologies.

RAM 370 is connected to communication bus 320 to provide microprocessor 310 with fast data storage and retrieval. In this regard, processor-executable process steps being executed by microprocessor 310 are typically stored temporarily in RAM 370 and executed therefrom by microprocessor 310. ROM 380, in contrast, provides storage from which data can be retrieved but to which data cannot be stored. Accordingly, ROM 380 is used to store invariant process steps and other data, such as basic input/output instructions and data used during boot-up of client device 300 or to control communication port 330. It should be noted that one or both of RAM 370 and ROM 380 may communicate directly with microprocessor 310 instead of over communication bus 320.

Data storage device 390 stores, among other data, processor-executable process steps of Web browser 392 that are executable to request and receive information from a Web server. Data storage device 390 also stores authorization data 394. Authorization data 394 includes information that is transmitted to location server 200 and/or backbone network 100 to allow determination of whether an entity operating client device 300 is authorized to receive positioning data. The information stored in authorization data 394 may comprise Web cookies. Storage device 390 may also store one or more of other applications, data files, device drivers and operating system files needed to provide functions related and unrelated to the present invention.

Figure 3:
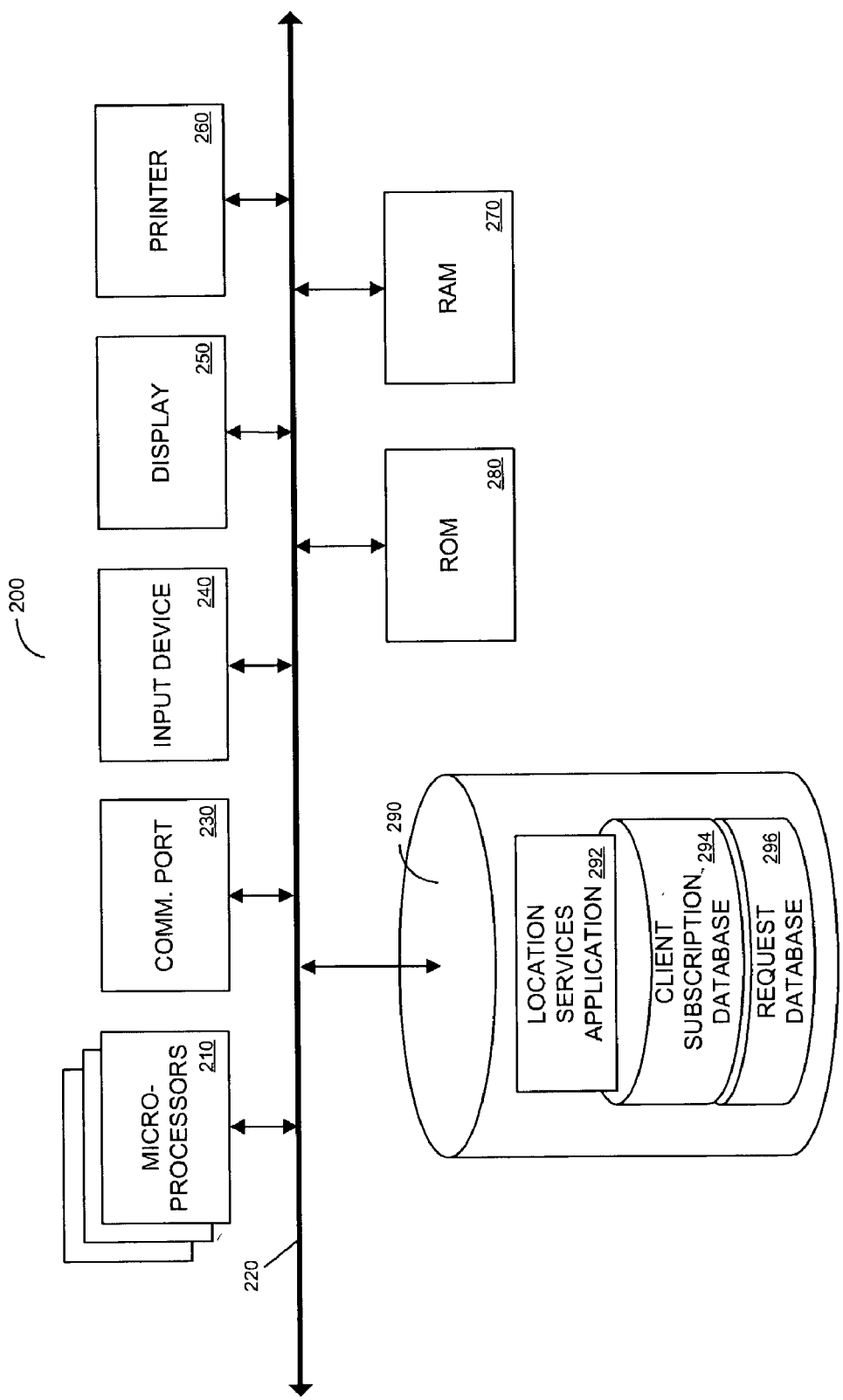
FIG. 3 is a block diagram illustrating elements of a location server according to some embodiments of the present invention.

FIG. 3 is a block diagram illustrating components of location server 200 according to some embodiments of the invention. It should be noted that these distinct components may comprise any of the specific examples given above with respect to identically-named components of client device 300. Of course, specific functions performed by the components may differ from the functions performed by the identically-named components. For example, microprocessors 210 may comprise RISC-based and other types of processors and are used to execute processor-executable process steps so as to control the elements of location server 200 to provide functionality described herein.

Data storage 290 stores process steps of location services application 292. As generally described below, the process steps may be executed by microprocessors 210 to receive a request for positioning a wireless LAN device, transmit the request to a backbone network, receive position information from the backbone network, the position information generated at least in part by a GPS-based device integrated with the wireless LAN device, and generate positioning data based on the position information. These process steps may include implementations of one or more location services protocols that are based on standard defined location protocols.

Location services application 292 may also include process steps of a Web server in order to facilitate the exchange of data with Web clients such as Web servers executed by client devices 300 and 302. Microsoft Internet Information Server™ is one example of a suitable Web server. The Web server may provide communication via a secure protocol such as secure hypertext transfer protocol (HTTPS). HTTPS is a communications protocol designed to transfer encrypted information between computers over the World Wide Web. Generally the HTTPS protocol is equivalent to a combination of the more-common HTTP protocol and the Secure Socket Layer (SSL) encryption protocol.

The process steps of location services application 292 may be read from a computer-readable medium, such as a floppy disk, a CD-ROM, a DVD-ROM, a Zip™ disk, a magnetic tape, or a signal encoding the process steps, and then stored in data storage device 290 in a compressed, uncompiled and/or encrypted format. In alternative embodiments, hard-wired circuitry may be used in place of, or in combination with, processor-executable process steps for implementation of processes according to embodiments of the present invention. Thus, embodiments of the present invention are not limited to any specific combination of hardware and software.

Data storage device 290 also stores client subscription database 294 and request database 296. Client subscription database 294 includes information relating to positioning service subscriptions held by various client entities. This information may be used to determine whether a client entity is authorized to receive positioning data and an amount to charge the client entity for positioning data. Request database 296 stores information associated with requests for positioning data received from client entities. This information may be used to determine parameters under which the positioning data should be generated and formatted.

Also stored in data storage device 290 may be other unshown elements that may be necessary for operation of location server 200. These elements may include an operating system such as Microsoft Windows 2000™, a database management system such as MS-SQL 7.0 with ODBC driver, a backup application, other applications, other data files, and "device drivers" for allowing microprocessor 210 to interface with devices in communication with communication port 230. These elements are known to those skilled in the art, and are therefore not described in detail herein.

Figure 4:
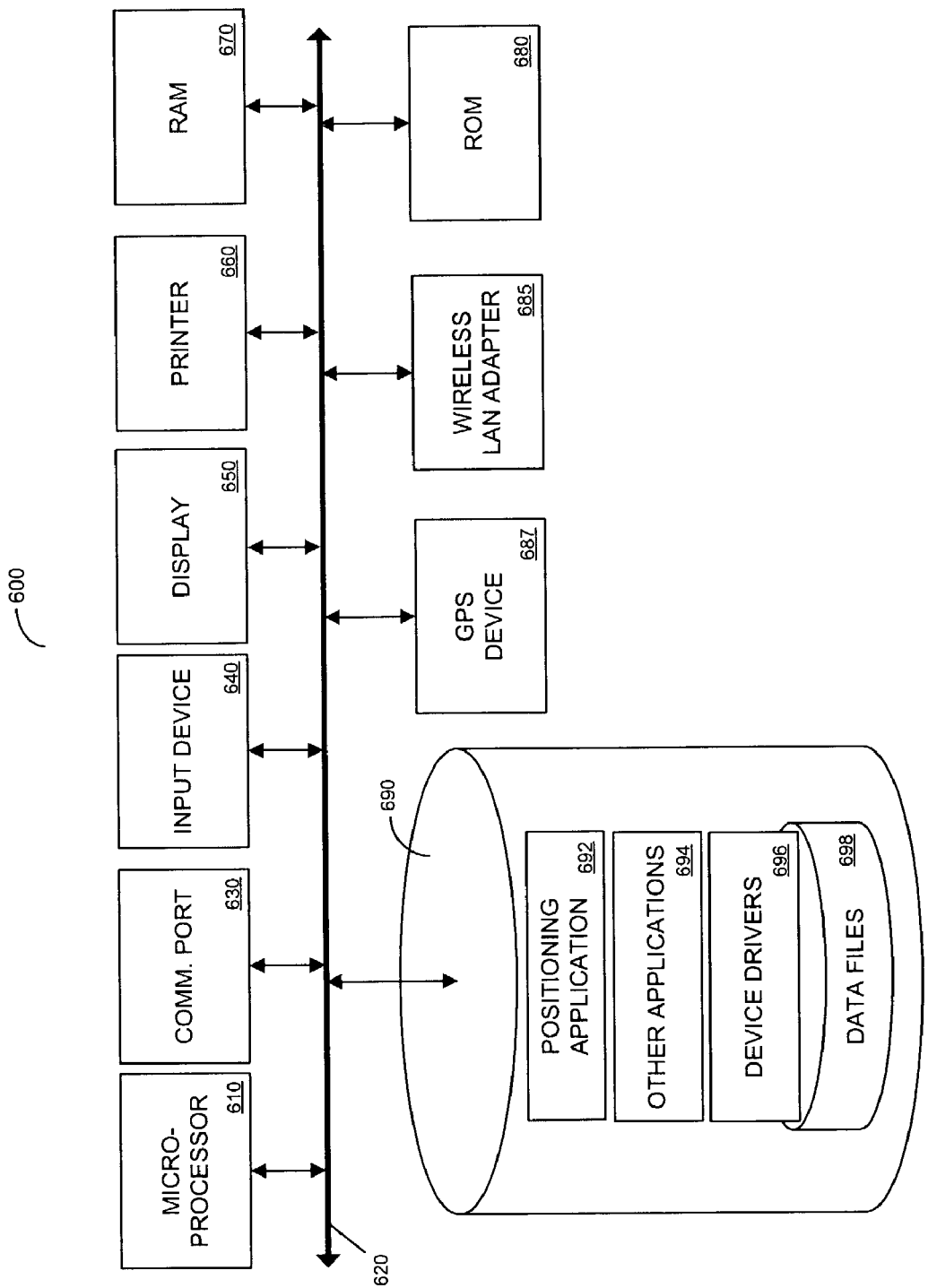
FIG. 4 is a block diagram illustrating elements of a wireless LAN device according to some embodiments of the present invention.

FIG. 4 illustrates several components of wireless LAN device 600 according to some embodiments of the invention. Microprocessor 610, RAM 670 and ROM 680 operate as described above with respect to identically-named components of client device 300. Moreover, input device 640, display 650 and printer 660 may comprise any of those devices described above and may be used in conjunction with applications provided by wireless LAN device 600 which are unrelated to the present invention.

Wireless LAN device 600 includes wireless LAN adapter 685 in communication with communication bus 620. Adapter 685 may comprise a PCMCIA card and provides communication with wireless access points such as access point 500. For example, requests for positioning information may be received from and positioning information may be transmitted to access point 500 via wireless LAN adapter 685. The positioning information may be generated using GPS device 687. GPS device 687 is an assisted GPS device in some embodiments, while GPS device 287 is a conventional GPS device in other embodiments.

Storage device 690 of wireless LAN device 600 stores processor-executable process steps of positioning application 692. The process steps may include steps to implement the functions of a positioning application layer according to a standards-based protocol. The positioning application layer may include the capability of receiving GPS assistance data from location server 200 and processing the received data in conjunction with GPS data received from satellite 250.

The process steps of positioning application 692 may be executed by microprocessor 610 to generate position information indicating a geographic position of wireless LAN device 600. The information may be generated using assisted GPS or standard GPS techniques. In this regard, other applications 694 may include any applications usable in conjunction with GPS device 687 to generate position information. Similarly, device drivers 696 include device drivers used to interface an operating system of wireless LAN device 600 with peripherals such as GPS device 687 and wireless LAN adapter 685. Other applications 694, device drivers 696, and data files 698 of storage device 690 may also include other files needed to provide functions related and unrelated to the present invention.

A tabular representation of a portion of client subscription database 294 is shown in FIG. 5. As described above, the information stored in client subscription database 294 is used to verify a client's authorization to obtain positioning data according to embodiments of the present invention. The portion includes several records, each consisting of several fields. The fields include client ID field 701, authorization data field 702, subscription type field 703, and expiration field 704.

Client ID field 701 of a particular record identifies a client who is the subject of the record. Authorization data field 702 specifies data such as a password used to verify an identity of an associated client. Authorization data field 702 may of course include any data usable to verify a client's identity, including an IP address of a client device associated with the client, address information or the like.

Subscription type field 703 specifies a type of subscription held by an associated client. Any subscription/payment arrangement may be used in conjunction with some embodiments of the present invention. According to the examples shown in FIG. 5, a client may hold a subscription to obtain an unlimited amount of positioning data, to obtain a certain amount of positioning data per a given time period, or to be charged for each reception of positioning data. In this regard, expiration field 704 specifies a data on which an associated subscription expires.

FIG. 6 illustrates a tabular representation of a portion of request database 296 according to some embodiments of the present invention. Each record of the illustrated representation is associated with a request for positioning a wireless LAN device. Accordingly, client ID field 801 of a record identifies a client from whom the associated request was received, and wireless LAN device ID field 802 identifies the wireless LAN device for which positioning data was requested.

Further details of the request are provided by type field 803, service quality field 804, and format field 805. More particularly, type field 803 indicates a classification of the request. Such classifications may be used to determine how the request is fulfilled and/or how much the client is charged for the request. For example, an "emergency" request may be given priority over outstanding "commercial" requests, but at a greater cost.

Service quality field 804 specifies the parameters of a request. In the example of FIG. 6, the parameters specify a geographic accuracy of the requested positioning data, a desired response time and a priority. The associated request may be filled using these parameters as absolute requirements, mere guidelines, or in any other manner.

Format field 805 indicates a format in which the client wishes to receive the positioning data. Location server 200 may convert the received data to the specified format in a case that the requested positioning data is received by location server 200 in a format that is different from the format specified in associated format field 805. Result field 806 stores the positioning data that is transmitted to the requesting client device in response to the associated request. In the example, the data specified in result field 806 of each record is formatted according to the format specified in associated format field 805.

The tabular illustrations and accompanying descriptions of databases 294 and 296 merely represent relationships between stored information. A number of other arrangements may be employed besides those suggested. It is further contemplated that each database may include many more records than those shown and that each record may include associated fields other than those illustrated.

Figure 7:
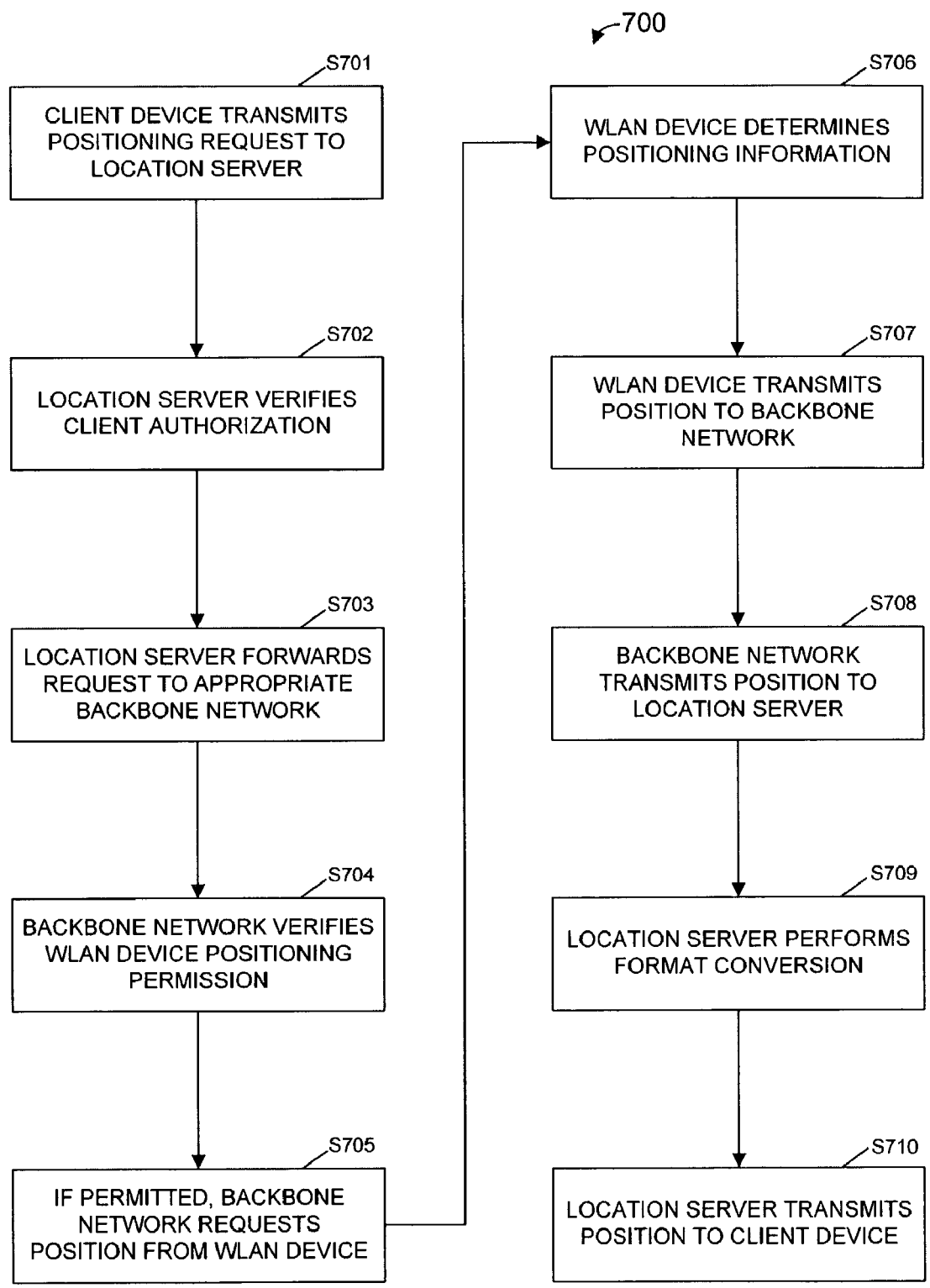
FIG. 7 is a flow diagram illustrating process steps according to some embodiments of the present invention.

FIG. 7 is a flow diagram of process steps 700 according to some embodiments of the invention. Although process steps 700 are described below generally with respect to one particular example, it should be noted that process steps 700 may be embodied in hardware and/or software of one or more of location server 200, client devices 300 and 302, backbone network 100, network device 400, access points 500 and 502, wireless LAN devices 600 through 608, and other devices.

Flow begins at step S701, in which client device 300 transmits a positioning request to location server 200. According to the present example, a client uses input device 340 of client device 300 to execute process steps of Web browser 392. Input device 340 is then used to manipulate an interface of Web browser 392 so as to request a home page from a Web server provided by location services application 292 of location server 200. The home page is requested by inputting an IP address or URL of the home page into the Web browser interface. The home page is transmitted from location server 200 to client device 300 using standard Web protocols. The home page may include, or may include links to pages that include, fields for inputting details of a request for positioning a wireless LAN device. The client operates input device 340 to input such details into the fields and to transmit the details to location server 200 in step S701.

Location server 200 verifies the client's authority to submit a request in step S702. In some embodiments, a client ID and authorization data from authorization data 394 is transmitted from client device 300 to location server 200 along with the request in step S701. The ID and authorization data are used to identify a record associated with the client in client subscription database 294. Once the record is identified, expiration field 704 of the record is analyzed to determine whether the client possesses an active subscription. Of course, many other systems for verifying client authorization may be used, including those that require the client to input a user ID and a password to client device 300 for transmission to location server 200. In a case that it is determined that the client possesses an active subscription, the details of the request are stored in request database 296 in association with the client ID and flow proceeds to step S703.

In step S703, location server 200 forwards the request to a backbone network associated with the subject wireless LAN device. In some embodiments, location server 200 is in communication with a database that associates wireless LAN device IDs with a particular backbone network. A backbone network according to some embodiments may include one or more devices in direct or indirect communication with location server 200. For example, network device 400, access point 500 and access point 502 may be individually or in any combination considered a backbone network. Moreover, backbone network 100 may comprise several individual backbone networks.

A wireless LAN device ID may be associated in the aforementioned database with one or more backbone networks currently in communication with and/or managing a wireless LAN device associated with the ID. Each backbone network may be associated with one or more microcells, therefore the database is updated in order to associate the device with an appropriate backbone network as the wireless LAN device moves among associated microcells.

The identified backbone network verifies positioning permissions in step S704 after receiving the request forwarded in step S703. More specifically, the backbone network determines if permission exists to provide the requested positioning information to the requesting client. Such permission may be specified by a profile associated with the wireless LAN device. The profile may be stored within the wireless LAN device and accessed by the backbone network in step S704 and/or may be stored in another data repository accessible by the backbone network.

The profile may specify various permission levels that are granted to various clients based on various parameters. For example, permission may exist to provide clients having one type of subscription with positioning information that specifies a location within one kilometer of the wireless LAN device. Clients having another type of subscription may, on the other hand, be provided with positioning information that specifies a location within one meter of the wireless LAN device. Positioning permissions may also relate to other constraints such as the speed with which and the format in which positioning information is generated.

The present example assumes that the requested positioning is permitted. Accordingly, the backbone network requests a position from the subject wireless LAN device in step S705. It should be noted that this request may occur prior to the permission verification in step S704. Specifically, the backbone network may initially request the position from the wireless LAN device and the wireless LAN device may use process steps of positioning application 692 to verify that appropriate permissions exist to fulfill the request.

The wireless LAN device determines the requested positioning information in step S706 using process steps of positioning application 692. The information is determined in some embodiments using assisted-GPS (AGPS) technology. According to some of these embodiments, the wireless LAN device comprises a GPS receiver and location server 200 includes an AGPS server and GPS device 210 that simultaneously receives signals from the same satellites as the GPS receiver. Briefly, the AGPS server predicts what signals the GPS receiver will receive and transmits that information to the wireless LAN device. The information is used to reduce the search space size and often reduces a time to first fix from minutes to seconds. Other embodiments of step S706 use a full GPS receiver within the wireless LAN device. In some of these latter embodiments, no GPS assistance information is supplied to the wireless LAN device. Rather, the GPS receiver present in the wireless LAN device operates in the conventional manner and calculates the positioning information.

The determined positioning information is transmitted from the wireless LAN device to the backbone network in step S707, and is transmitted therefrom to the location server 200 in step S708. The positioning information is then converted in step S709 to positioning data in a format specified by the request transmitted in step S701. In some embodiments of step S709, the received positioning information is in a format different from that specified by the request. Accordingly, location services application 292 includes process steps to convert the positioning information to the specified format. In some embodiments, the wireless LAN device determines the positioning information in step S706 according to the specified format. The format conversion of step S709 might not alter the received positioning information in these latter embodiments.

Next, in step S710, location server 200 transmits the positioning data to client device 300. The positioning information may be transmitted by creating a web page that includes the positioning information and transmitting the web page to client device 300. The web page is then viewed on display 350 by the requesting client.

Figure 8:
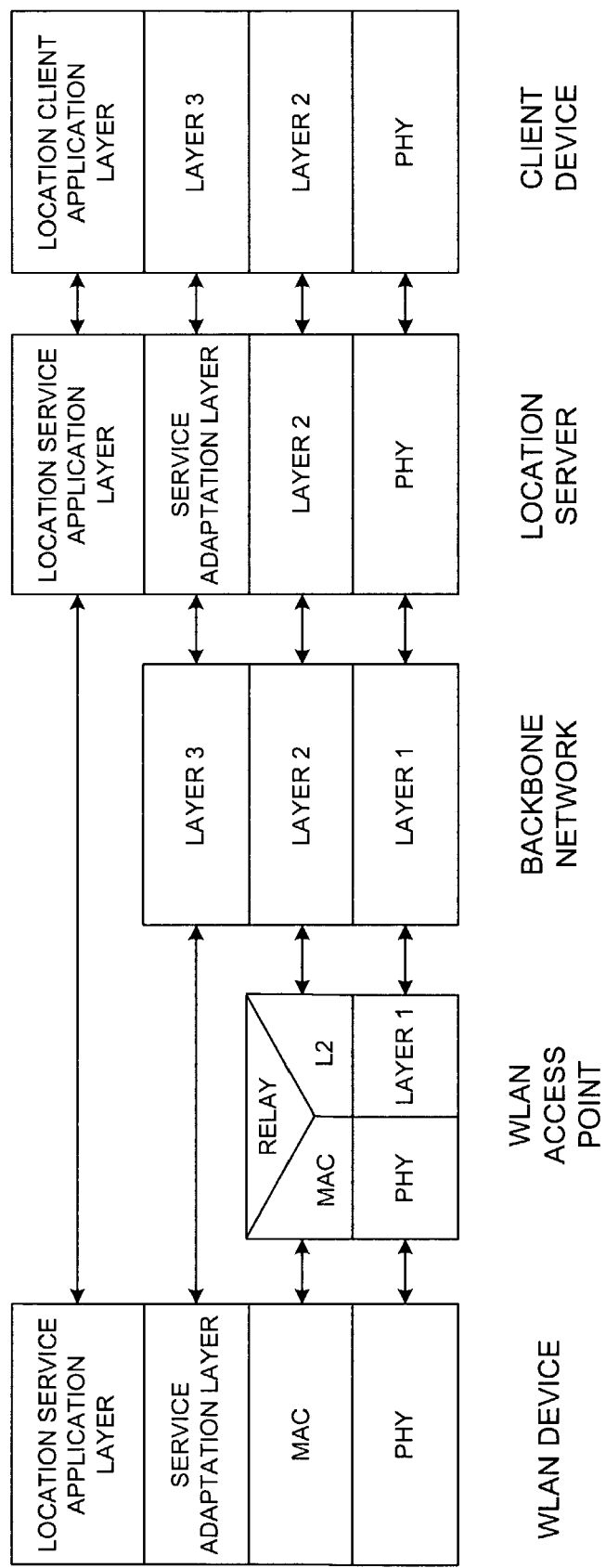
FIG. 8 is a diagram illustrating a signaling protocol according to some embodiments of the present invention.

FIG. 8 illustrates a signaling protocol according to some embodiments of the present invention. The illustrated location service application layer advantageously enables peer-to-peer communication between a wireless LAN device and location server 200. Examples of the "Layer 1" protocol include SONET and ATM protocols, examples of the "Layer 2" protocol include ATM and frame-relay protocols, and examples of the "Layer 3" protocol include IP protocol. The "PHY" and "MAC" layers may follow the IEEE 802.11 specification or any other appropriate specification or specifications. Of course, the signaling protocol of some embodiments of the invention may differ from that shown in FIG. 8. In this regard, any suitable currently or hereafter-known protocols may be used in conjunction with some embodiments of the invention.

Those in the art will appreciate that various adaptations and modifications of the above-described embodiments can be configured without departing from the scope and spirit of the invention. For example, the particular arrangement of process steps 700 is not necessarily meant to imply a fixed order to the steps; embodiments of the present invention can be practiced in any order that is practicable. Therefore, it is to be understood that, within the scope of the appended claims, the invention may be practiced other than as specifically described herein.

What is claimed is:

1. A method for positioning a wireless LAN device, comprising:
    receiving, by a location server a request for positioning of a wireless LAN device from a client device;
    transmitting the request to the wireless LAN device from the location server via a backbone network;
    receiving position information from the backbone network, the position information generated, in response to the request, at least in part by a GPS-based device integrated with the wireless LAN device;
    generating positioning data based on the position information by the location server; and
    transmitting the positioning data to the client.

2. A method according to claim 1, wherein the step of transmitting the request to the wireless LAN device via the backbone network further comprises:
    determining that the backbone network is associated with the wireless LAN device.

3. A method according to claim 1, wherein the step of generating positioning data based on the position information comprises:
    generating positioning data based on the position information and on the request.

4. A method according to claim 3, wherein the request identifies a format and wherein the step of generating positioning data comprises:
    converting the position information to the format.

5. A method according to claim 1, wherein the integrated device is an assisted GPS device.

6. A method according to claim 5, further comprising:
transmitting assisted GPS data to the wireless LAN device.

7. A computer-readable medium storing processor-executable process steps to position a wireless LAN device, the process steps comprising:
a step to receive, by a location server, a request for positioning of a wireless LAN device from a client device;
a step to transmit the request to the wireless LAN device via a backbone network;
a step to receive position information from the backbone network, the position information generated, in response to the request, at least in part by a GPS-based device integrated with the wireless LAN device;
a step to generate positioning data based on the position information by the location server; and
a step to transmit the positioning data to the client device.

8. A medium according to claim 7, wherein the step of transmitting the request to the wireless LAN device via the backbone network further comprises:
a step to determine that the backbone network is associated with the wireless LAN device.

9. A medium according to claim 7, wherein the request identifies a format and wherein the step of generating positioning data based on the position information comprises:
a step to convert the position information to the format.

10. A medium according to claim 7, wherein the integrated device is an assisted GPS device, the process steps further comprising:
a step to transmit assisted GPS data to the wireless LAN device.

11. A device for positioning a wireless LAN device, comprising:
at least one memory storing processor-executable process steps;
at least one processor in communication with the at least one memory and operative in conjunction with the stored process steps to:
receive, by a location server, a request for positioning a wireless LAN device from a client device;
transmit the request to the wireless LAN device via a backbone network;
receive position information from the backbone network, the position information generated, in response to the request, at least in part by a GPS-based device integrated with the wireless LAN device;
generate positioning data based on the position information by the location server; and
transmit the positioning data to the client device.

12. A system for positioning a wireless LAN device, comprising:
a client device for transmitting a positioning request, the positioning request identifying a wireless LAN device;
a location server for receiving the request; and
a backbone network for transmitting the request from the location server to the wireless LAN device and receiving position information from the wireless LAN device, said position information generated, in response to the request, at least in part by a GPS-based device integrated with the wireless LAN device,
wherein the backbone network transmits the position information to the location server, and
wherein the location server determines positioning data based on the position information and the request, and transmits the positioning data to the client device.

13. A system according to claim 12, wherein the positioning request comprises a quality of service and a position format.

14. A system according to claim 13, wherein the backbone network requests the position from the wireless LAN device by transmitting the quality of service to the wireless LAN device.

15. A system according to claim 13, wherein the location server determines the positioning data by converting the position information to the position format.

16. A system according to claim 12, wherein the location server confirms an authorization of the client device based at least on the request.

17. A system according to claim 12, wherein the backbone network determines whether permission to receive the position information from the wireless LAN device exists, and
wherein if permission does not exist, the backbone network does not receive position information from the wireless LAN device.

18. A system according to claim 12, wherein the position information comprises a position, errors associated with the position, and a timestamp.

19. A system according to claim 12, wherein the wireless LAN device comprises an assisted GPS system.

* * * * *